(12) United States Patent
Nakatani

(10) Patent No.: US 6,653,809 B2
(45) Date of Patent: Nov. 25, 2003

(54) METHOD FOR HEAD POSITIONING

(75) Inventor: Tatsuya Nakatani, Hyogo (JP)

(73) Assignee: Agilent Technologies, Inc., Palo Alto, CA (US)

( * ) Notice: Subject to any disclaimer, the term of this patent is extended or adjusted under 35 U.S.C. 154(b) by 9 days.

(21) Appl. No.: 10/145,267

(22) Filed: May 14, 2002

(65) Prior Publication Data

US 2002/0190681 A1 Dec. 19, 2002

(30) Foreign Application Priority Data

Jun. 5, 2001 (JP) ........................................ 2001-169919

(51) Int. Cl.$^7$ .............................................. G05B 11/01
(52) U.S. Cl. ....................... 318/560; 318/138; 318/254; 318/500; 318/700; 318/767
(58) Field of Search ................................. 318/560, 138, 318/254, 500, 439, 700, 710, 721, 762, 767; 360/77.04, 78.09; 388/809

(56) References Cited

U.S. PATENT DOCUMENTS

| | | | |
|---|---|---|---|
| RE35,469 E | * | 3/1997 | Ueki ........................... 318/138 |
| 5,793,559 A | * | 8/1998 | Shepherd et al. ........ 360/78.09 |
| 5,808,435 A | | 9/1998 | Mager ......................... 318/593 |
| 6,061,200 A | * | 5/2000 | Shepherd et al. ........ 360/77.04 |
| 6,195,215 B1 | | 2/2001 | Yanagimoto et al. ......... 360/25 |

FOREIGN PATENT DOCUMENTS

| | | |
|---|---|---|
| JP | 5-298632 | 11/1993 |
| JP | 07105516 | 4/1995 |
| JP | 08161717 | 6/1996 |

OTHER PUBLICATIONS

"New Compact Spin Stand Platform," Dover Instrument Corporation, Aug. 28, 2001.

* cited by examiner

*Primary Examiner*—Karen Masih

(57) ABSTRACT

A method for head positioning utilizing a positioning device that moves a head includes receiving position commands that control the positioning device and determining whether or not the distance between the current position and the movement target position exceeds the predetermined threshold, and if the above-mentioned distance does not exceed the above-mentioned predetermined threshold, moving the head along a predetermined fixed path, while if the above-mentioned distance exceeds the above-mentioned predetermined threshold value, selecting one of a plurality of other paths and moving the head along the selected path. Thus, the speed of head positioning is increased.

2 Claims, 11 Drawing Sheets

METHOD FOR HEAD POSITIONING

BACKGROUND OF THE INVENTION

1. Field of the Invention

The present invention pertains to recording devices in general and in particular, to high-speed positioning of the read-write head of recording devices. The high-speed positioning technology of the present invention is ideal for use in spin stands of recording devices that are used to determine performance and properties of recording devices.

2. Discussion of the Background Art

Hard disk drives (HDD) are widely used in information recording media for recording large volumes of digital data, beginning with electronic computers.

HDDs generally comprise a substrate, a magnetic disk, which is a non-magnetic disk covered with magnetic thin film, a spindle motor that is anchored to the substrate and rotates the magnetic disk at high speed, a slider that has a recording element and a head, which is the reproducing element, on its surface, a head gimbal assembly (HGA) with the slider at its end, an arm with suspension that supports the HGA, and a rotary actuator that is anchored to the substrate and drives the arm. Furthermore, a single HDD has several magnetic disks and heads depending on the recording capacity of the HDD.

The working principle of the HDD is as follows: The center of a magnetic disk is held by a spindle and rotates at high speed from 4,000 to 15,000 rotations per minute. The slider is guided by an arm that is driven by a rotary actuator and moved so that the space between the outer periphery and the innermost periphery of the magnetic disk forms an arc. Moreover, when information is being recorded or reproduced, the slider that is above the magnetic disk maintains an inclined posture so that a wedge-shaped space is formed with the magnetic disk as it floats at a very small distance above the magnetic disk under the air current that is produced on the surface of the magnetic disk rotating at a high speed. Once the slider has been positioned at a predetermined position on the magnetic disk by the rotary actuator, the magnetic disk is magnetized and information is recorded by the recording element attached to the slider. Moreover, the magnetic field from the magnetic disk is detected and information is reproduced by the reproducing element attached to the same slider.

Furthermore, recording and reproduction of information is performed on the memory region that has been made by physically subdividing the magnetic disk recording surface. For instance, reading and writing are performed on an annular memory region called a track having a predetermined width that has been made along the concentric circumference of the magnetic disk.

The HDD accumulates information and therefore, each part comprising the HDD undergoes rigorous testing because there must be complete reliability during recording and reproduction of information. A head testing device that records or reproduces information on a magnetic disk for testing and evaluates the performance and properties of the head is used to test heads.

An oblique view of the conventional head testing device 10 is shown in FIG. 1. Head testing device 10 in FIG. 1 consists of reference table 11, cassette 30 that holds head 20 at the end, carriage 12 that holds cassette 30, piezo stage 13 that fine-positions carriage 12 horizontal with respect to reference table 11, head-loading mechanism (HLM) 14 that positions piezo stage 13 perpendicular with respect to reference table 11, stage 15 anchored to reference table 11 that coarse-positions HLM 14 horizontal with respect to reference table 11, and disk rotating device 50 anchored to reference table 11 that holds the center of magnetic disk 40 with rotating shaft 51 so that magnetic disk 40 is horizontal with respect to reference table 11 and magnetic disk 40 rotates around its axis using motor 52.

A summary of the effects of the above-mentioned structure is as follows: Piezo positioner 13 is coarse-positioned by stage 15 and then carriage 12 is fine-positioned by piezo stage 13. Head 20 is positioned at a predetermined position over magnetic disk 40 by these positioning operations. Furthermore, head 20 is moved up and down above magnetic disk 40 by HLM 14 and floats above the surface of magnetic disk 40 or rests above the surface of magnetic disk 40. Head 20 generates a magnetic field when it floats above the surface of magnetic disk 40 and writes information on magnetic disk 40 or detects a magnetic field and reads information from the magnetic disk.

The following are items evaluated by a head testing device. These include the track average amplitude (TAA), which is the average amplitude of reproduction signals that are output from the head; the track profile (TP) representing the TAA distribution relative to displacement from the track center line (TCL) within a track; the overwrite (OW), which is represented by the attenuation factor of the LF signals when the highest frequency signals (HF signals hereafter) are overwritten on the lowest frequency signals (LF signals hereafter) recorded on a magnetic disk; the bit error rate (BER), etc. For instance, the head moves in micro-increments from one side of the track width to the other in order to determine the TAA distribution in the direction of width with the track center line serving as the center in the track profile determinations. Moreover, it also moves between tracks because there are fluctuations, etc., in determination results between the inner and outer periphery of the magnetic disk. Thus, in addition to the magnetic disk being read by the head, the head also frequently moves during head tests.

When determining the above-mentioned evaluation items, mechanical and electrical parameters are established for the head testing device. The following are the mechanical parameters: The radius, which is represented by distance when the center of the disk is the reference point; the skew angle, which is the angle formed between the head and the circumferential tangent of the magnetic disk; spindle rotational speed, etc., all of which are absolute positions of the magnetic disk. The following are the electric parameters: The signal frequency, the signal current, the data pattern, the MR head bias current, etc., when magnetic signals are being written or read.

Head testing device 10 determines the above-mentioned evaluation items while simulating operation of the hard disk. For instance, the head is moved by the rotary actuator while describing an arc above the magnetic disk, as previously mentioned, and therefore, the head skew angle increases as the head moves from the side of the inner periphery to the outer periphery. The skew angle relative to the radius varies with each type of HDD, even if the radius remains the same. Therefore, head testing device 10 calculates the position on magnetic disk 40 that satisfies both the radius and the skew angle and positions the head at the position obtained by calculation. Head 20 moves in micro-increments within the track above the magnetic disk while moving between tracks in order to determine fluctuations in the determination results when head 20 is being tested, for instance, during track profile determinations. The testing time for head 20 includes movement such as movement within a track and movement between tracks, etc., and therefore, it is preferred that head 20 linearly move the shortest distance so that the movement time for head 20 will be curtailed in order to reduce the testing time of head 20. Nevertheless, when head 20 moves linearly above magnetic disk 40, there is a chance that head 20 or cassette 30 holding head 20 will impact spindle 51 holding magnetic disk 40, etc.

A specific example of impact is shown in FIG. 2. FIG. 2 is a diagram of head 20 attached to cassette 30 and magnetic disk 40 held by spindle 51, seen from above. The skew angle of head 20 is 0 degrees directly beneath with spindle 51 in the center, that is, when head 20 is at 3 o'clock, but when the head moves toward 2 o'clock, the skew angle becomes −30 degrees, and when the head moves toward 4 o'clock, the skew angle becomes +30 degrees. It is therefore clear that when head 20 moves from the standby position away from magnetic disk 40 to a predetermined position above magnetic disk 40 in FIG. 2, cassette 30 impacts spindle 51 if head 20 moves linearly. Moreover, when the movement of head 20 is confined to a fixed path in this same way so that it will make a wide circle around spindle 51 in order to automatically avoid impact, head 20 does not stay above magnetic disk 40 and this poses a problem when head 20 is floating above the magnetic disk. Therefore, by means of the prior art, a path of movement for head 20, cassette 30, spindle 51, magnetic disk 40, etc., of head testing device 10 when head 20 is moving is pre-selected so that head 20 can avoid impact from other objects when head 20 is moving, and this path is based on the shape data of head 20, and objects surrounding head 20, and head 20 is moved in accordance with this selected path.

Nevertheless, there is a problem in that the time necessary for the impact-avoidance operation imposes on the head testing time. Head movement includes movement in microincrements within a track, movement between tracts, and further, movement inside and outside the magnetic disk region. There is no impact of the head and cassette with other objects during movement in micro-increments within a track, and there is also no impact when the head slips from above the magnetic disk. There have been no problems with the strict impact avoidance operation for all movements in the past because magnetic information is read and written in track units and determinations are conducted once while the magnetic disk rotates once. Nevertheless, today's tracks are further subdivided and determinations are conducted in head tests based on reading and writing of magnetic information in sector units and it is necessary to wait for the head movement to be completed for each determination. There is a strong demand for HDDs, beginning with computers, but cost competition is intense and there is a desire to reduce testing time in order to reduce manufacturing costs. Therefore, there is a need for a head-positioning control method for curtailing the head movement time, which is one element of the testing time.

SUMMARY OF THE INVENTION

The object of the present invention is to solve the above-mentioned problems of the prior art, its purpose being to judge whether or not an impact avoidance path is necessary in accordance with the head movement distance and thereby move the head on a fixed path without performing the operation of the impact avoidance path and thus improve the speed of the head positioning.

Another object is to present a testing device with which either one or both of the head and recording medium to which a spin stand for head determination is attached is or are tested, and with which high-speed, as well as high-precision determination is possible using a method for improving head-positioning speed.

In short, the first invention is one wherein by means of the method for head positioning of a device having a recording medium, a head for operating the recording medium and sending and receiving information to and from this recording medium, and a positioning control mechanism that positions by moving the head from the first to the second position in accordance with position commands, the above-mentioned position commands are received and it is determined whether or not the distance between the above-mentioned first position and the above-mentioned second position exceeds the predetermined threshold and if the above-mentioned distance does not exceed the above-mentioned predetermined threshold, the above-mentioned head is moved along a predetermined fixed path, while if the above-mentioned distance exceeds the above-mentioned predetermined threshold value, one of several possible paths is selected and the above-mentioned head is moved along the above-mentioned selected possible path.

Moreover, the second invention is one wherein by means of the method for head positioning of a device having a recording medium, a head for operating the recording medium and sending and receiving information to and from this recording medium, and a positioning control mechanism that aligns by moving the head from the first to the second position in accordance with position commands, the above-mentioned position commands and path selection approval commands that approve the operation of path selection are received, and if the above-mentioned path selection approval commands do not approve the path selection, the above-mentioned head is moved along the predetermined fixed path based on the above-mentioned position commands, while if the above-mentioned path selection approval commands do approve the path selection, one of several possible paths is selected based on the above-mentioned position commands and the above-mentioned head is moved along the above-mentioned selected possible path.

DEFINITION OF SYMBOLS

Figure 1:
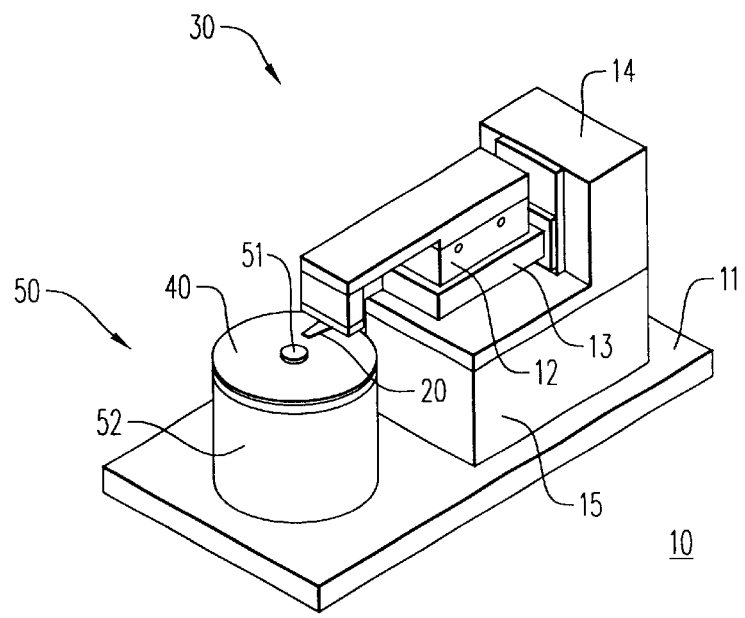
FIG. 1 is an oblique view of a head testing device of the prior art.
Figure 2:
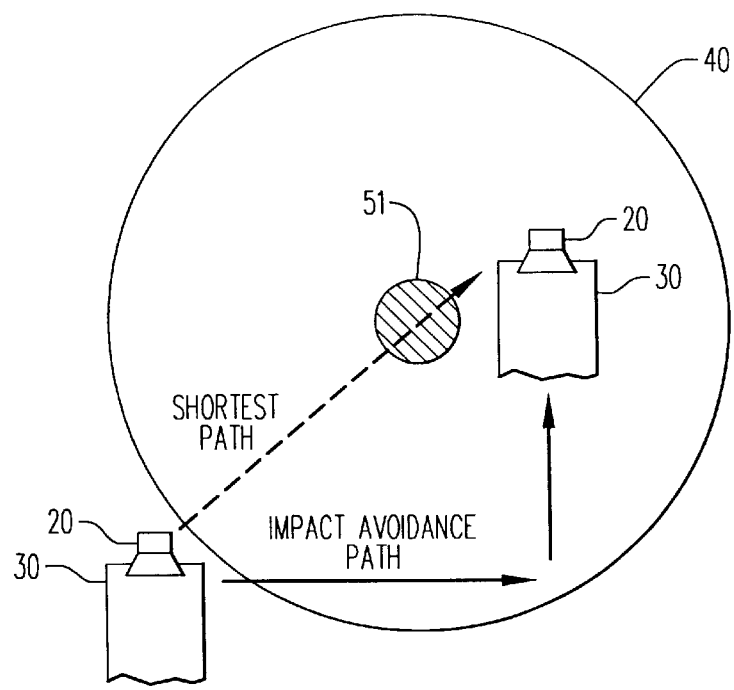
FIG. 2 is a first top view showing the movement of a head with the head testing device of the prior art.
Figure 3:
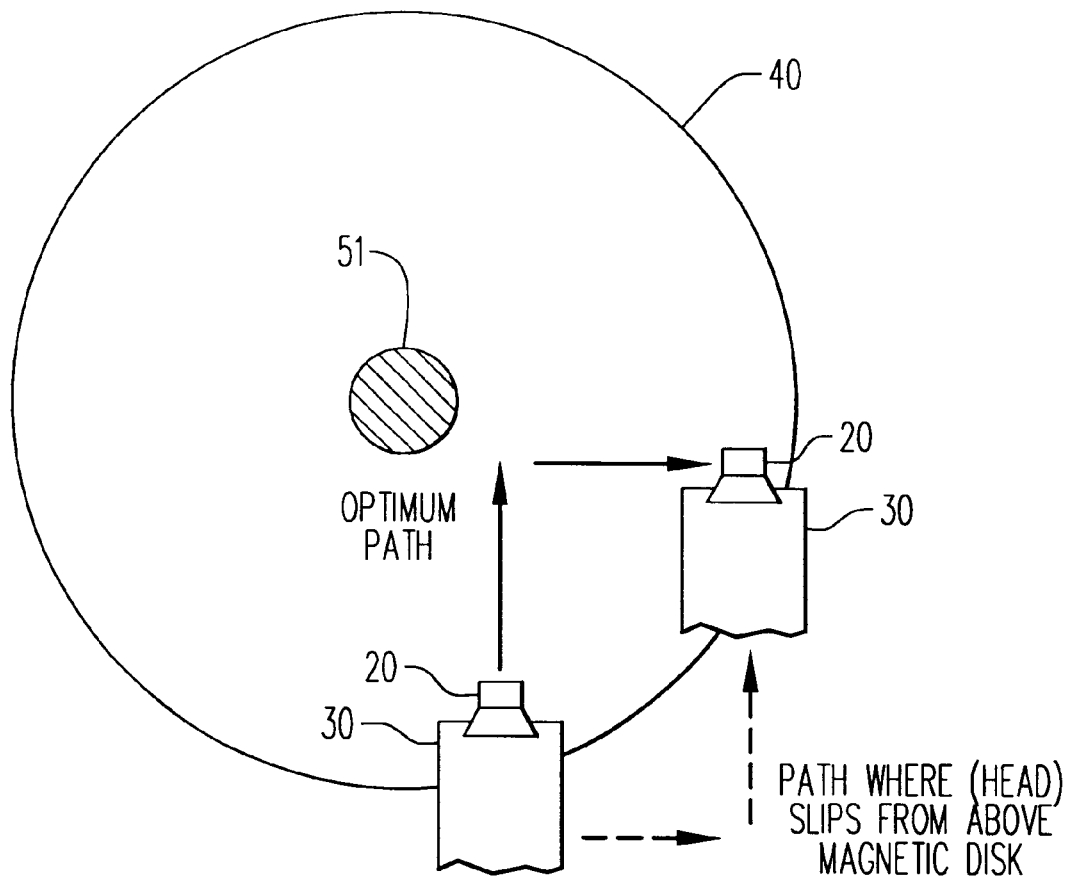
FIG. 3 is a second top view showing the movement of a head with the head testing device of the prior art.

10. Head testing device
11. Substrate (reference table)
12. Carriage
13. Piezo stage
14. HLM
15. Stage
20. Head
30. Cassette
40. Magnetic disk
50. Disk rotating device
51. Spindle
52. Motor
100. Spin stand
101. Magnetic disk
102. Spindle
103. Spindle motor
104. Head
105. Index sensor
106. Cassette
107. Polygon
108. Innermost determination circle
111. Spindle drive circuit
113. Write-read circuit
114. Fine-positioning device
115. Coarse-positioning device
200. Determination device
220. Main controller
230. Trigger distribution module
231. Write control module
232. Read control module
233. Head-position control module
234. Spindle control module
235. Bus
240. Controller
241. Reference table memory
242. Multiplier
250. Controller
251. Parameter-setting part
252. Reference table memory
253. Write control part
260. Controller
261. Parameter-setting part
262. Reference table memory
263. Read control part
270. Controller
271. Reference table memory

DETAILED DESCRIPTION OF THE INVENTION

Figure 4:
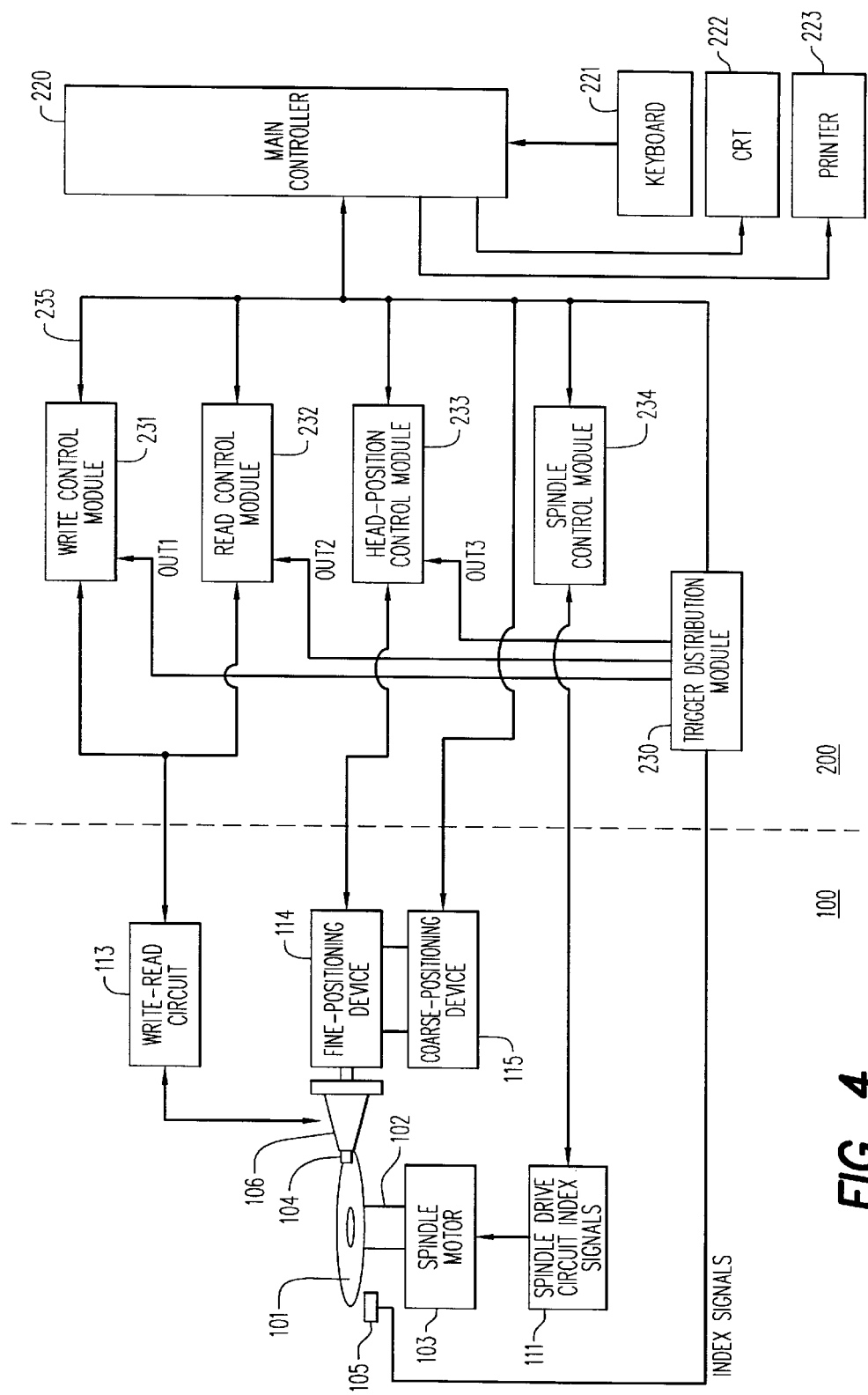
FIG. 4 is a block diagram of a head testing device related to the present invention.

The present invention is described below based on the examples shown in the attached figures. The first example in FIG. 4 is a head testing device for hard disks in which the head is position-controlled by the method of the present invention. This device has spin stand 100 and determination device 200. Furthermore, FIG. 4 is a block diagram showing the structure of the head testing device.

In FIG. 4, spindle 102 rotates once and 1 index signal is output from index sensor 105 with 1 rotation of magnetic disk 101, which is an example of a recording medium. Trigger distribution module 230 generates several sector trigger signals (sector trigger signals hereafter) in accordance with 1 index trigger signal (also called index signal hereafter) or the sector of magnetic disk 101 in response to this index signal and outputs to write control module 231, read control module 232, and head-position control module 233. Furthermore, the index trigger signals and sector trigger signals are referred to together simply as trigger signals. Write control module 231 writes on magnetic disk 101 for head testing by performing the write control process in FIG. 9 in response to trigger signals. Moreover, read control module 232 reads from magnetic disk 101 for head testing by performing the read control process in FIG. 10 in response to trigger signals. Furthermore, head-position control module 233 performs head-position control processing for the positioning of cassette 106 to which head 104 is attached above magnetic disk 101 by performing the head-position control process in FIG. 11 in response to trigger signals.

In general terms, spin stand 100 in FIG. 4 has the following 4 main parts: Specifically, it has (a) a spindle 102 that rotates magnetic disk 101, a spindle motor 103 that rotates and drives spindle 102, and a spindle drive circuit 111 that controls spindle motor 103, (b) positioning devices 114 and 115 with a head-position control mechanism, (c) a write-read circuit 113, and (d) a disk sensor 105.

Here, spindle 102 is inserted into the middle of magnetic disk 101 so that magnetic disk 101 is supported, spindle motor 103 is connected to spindle 102, and magnetic disk 101 is rotated as a result of spindle 102 being rotated when spindle motor 103 rotates. When spindle 102 is rotated to rotate magnetic disk 101, 1 index signal for 1 rotation is detected by index sensor 105, which is directly beneath magnetic disk 101, and is output to trigger distribution circuit 230 of determination device 200. Spindle motor 103, which is driven by spindle drive circuit 111 so that it rotates, is controlled by spindle control module 234 and once set, the revolutions per minute of spindle motor 103 usually does not change.

As previously mentioned, the head-position control mechanism is made from two main devices. One is a fine-positioning device 114, which is comprised of a piezo stage, etc., and the other is coarse-positioning device 115, which is comprised of an X-Y stage, etc. Fine-positioning device 114 is in charge of the subtle position adjustment of head 104 that is necessary for track profile determination, etc. Moreover, coarse-positioning device 115 is in charge of the position adjustment of fine-positioning device 114. Here, head 104 is supported such that it can move in the radial direction and perpendicular to this radial direction of magnetic disk 101 and perpendicular to the surface of magnetic disk 101 so that it is magnetically joined without making contact with the surface of magnetic disk 101, and the position of head 104 is controlled by fine-positioning device 114 and coarse-positioning device 115 joined to head 104. Moreover, write-read circuit 113 receives write signals, read signals and control signals from read control module 232 and write control module 231 of determination device 200 and performs predetermined processing as described below in detail:

Determination device 200 mainly comprises trigger distribution module 230, write control module 231, and main controller 220 that controls the operation of modules 230, 231, 232, and 233. Main controller 220 has a keyboard 221, which is the input means, and a CRT display 222 and a printer 223, which are the output means. Modules 230, 231, 232, and 233 are connected to main controller 220 of determination device 200 by bus 235. Main controller 220 begins operation in accordance with the support data of operators who input from keyboard 221 and controls the operation of modules 230, 231, 232, and 233 so that processing, such as correction and analysis, etc., are conducted based on the data of determination results input from read control module 232 and data after processing are output together with determination results to CRT display 22, and, when necessary, data are output to printer 223 as well and printed. Write control module 231 generates write control signals, which include not only write signals, but also the setting of the write current and write timing signals, etc., and outputs these to write-read circuit 113. The write signals are processed, such as modulated, etc., as needed at write-read circuit 113 and written on magnetic disk 101 by head 104. Write-read circuit 113 gives predetermined write parameter values in accordance with the write control signals that are input here. Read control module 232 not only receives read signals that will be input from head 104 via write-read circuit 113, but also generates read control signals, such as the setting of MR bias, read timing, etc., which are necessary for reading and outputs them to write-read circuit 113. Here, the read signals from head 104 are processed, such as amplified, etc., as needed by write-read circuit 113 and input to read control module 232. Moreover, write-read circuit 113 gives predetermined read parameter values in accordance with the read control signals.

Figure 5:
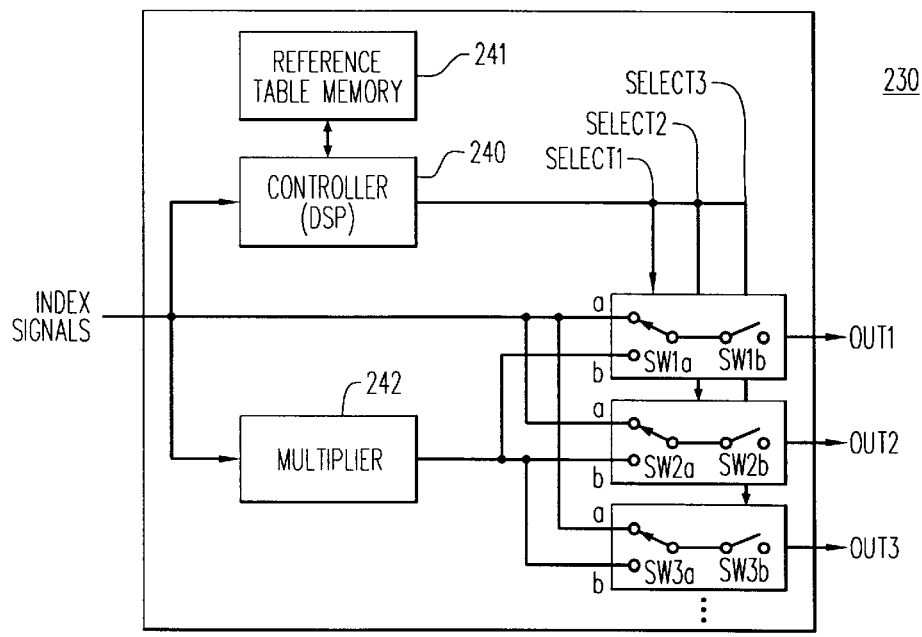
FIG. 5 is a block diagram showing the structure of trigger distribution module 230 of FIG. 4.

FIG. 5 is a block diagram showing the structure of trigger distribution module 230 of FIG. 4. Index signals from trigger distribution module 230 are input to controller 240 and multiplier 242 and controller 240 generates the selection signals called select 1, select 2, and select 3 for controlling the switching of switches SW1a, SW2a, SW3a, . . . and the on-off of switches SW1b, SW2b, SW3b, . . . , while referring to the operation processing data of the reference table in reference table memory 241 in response to the index signals that are input, and then outputs these signals to switches SW1a, SW2a, SW3a, SW1b, SW2b, SW3b, . . . , respectively. Index signals are input to write control module 231 as a trigger signal OUT1 via the a side of switch SW1a and switch SW1b. Moreover, the same index signals are output to read control module 232 as a trigger signal OUT2 via the a side of switch SW2a and switch SW2b, and the same index signals are further output to head-position control module 233 as a trigger signal OUT3 via the a side of switch SW3a and switch SW3b.

Multiplier 242 multiplies the index signals that are input by 10, for instance, and sector signals corresponding to each sector 1s after multiplication are generated. The sector signals that have been generated are output to write control module 231 as a trigger signal OUT1 via the b side of switch SW1a and switch SW1b, the same sector signals are output to read control module 232 as a trigger signal OUT2 via the b side of switch SW2a and switch SW2b, and the same sector signals are output to write control module 233 as a trigger signal OUT3 via the b side of switch SW3a and switch SW3b.

Figure 6:
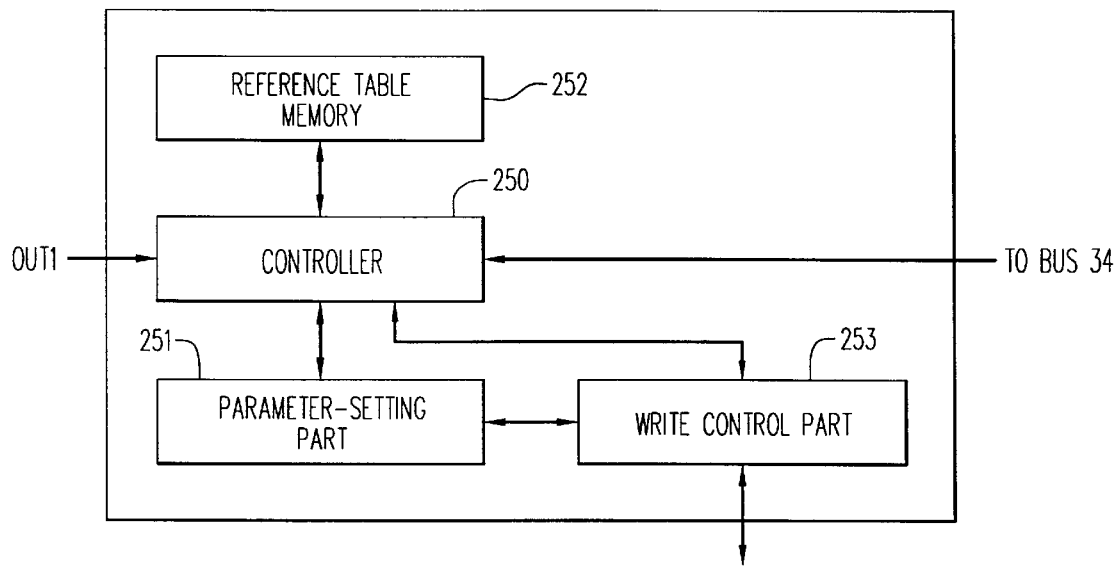
FIG. 6 is a block diagram showing the structure of write control module 231 of FIG. 4.

FIG. 6 is a block diagram showing the structure of write control module 231 of FIG. 4. Controller 250 in FIG. 6 is the control circuit that controls the operation of write control module 231. It is connected to main controller 220 via bus 235 and has a D/A converter for establishing the write parameters, such as write current, etc., a timer that determines the determination time, etc., while referring to the operation processing data in reference table memory 252 in response to the trigger signal OUT1. The write control processing in FIG. 9 is conducted and the write processing in spin stand 100 is performed by controlling parameter-setting part 251, which controls the operation of write control part 253, and write control part 253, which is connected to write-read circuit 113.

Figure 7:
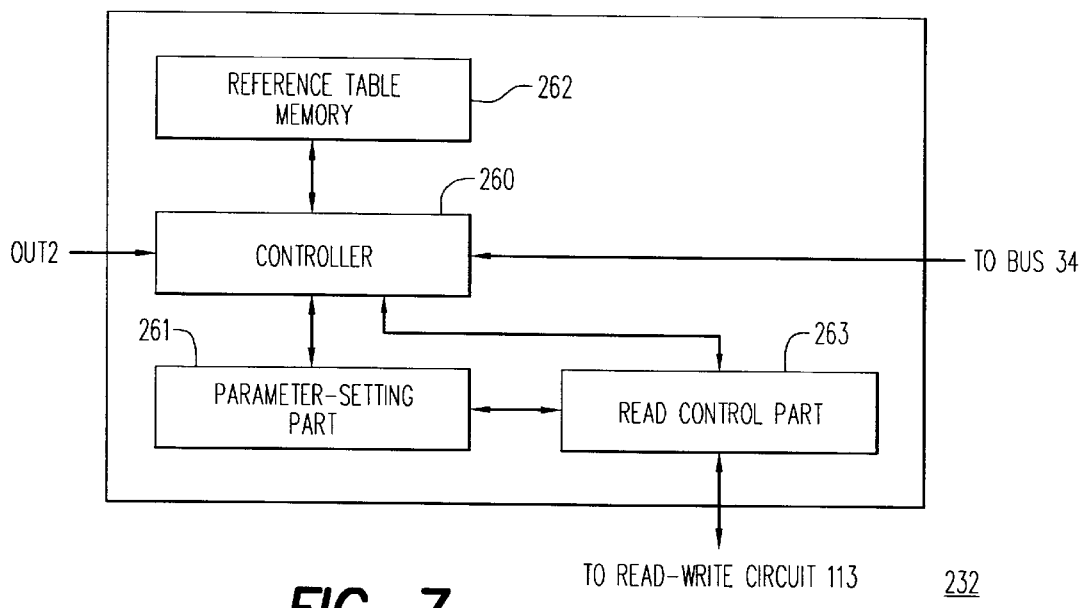
FIG. 7 is a block diagram showing the structure of read control module 232 of FIG. 4.

FIG. 7 is a block diagram showing the structure of read control module 232 of FIG. 4. Controller 260 in FIG. 7 is the control circuit that controls the operation of read control module 232. It is connected to main controller 220 via bus 235 and has a D/A converter for establishing the read parameters, such as read current, etc., a timer that determines the determination time, etc., while referring to the operation processing data in reference table memory 262 in response to the trigger signal OUT2. The read control processing in FIG. 10 is conducted and the read processing in spin stand 100 is performed by controlling parameter-setting part 261, which controls the operation of the read control part 263, and read control part 263, which is connected to write-read circuit 113.

Figure 8:
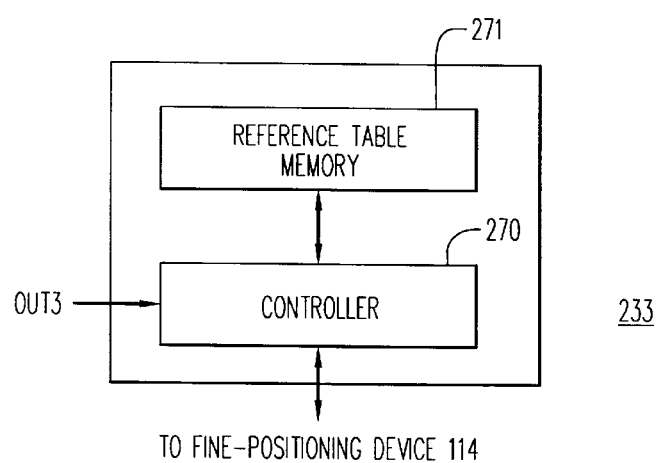
FIG. 8 is a block diagram showing the structure of head-position control module 233 of FIG. 4.
Figure 11:
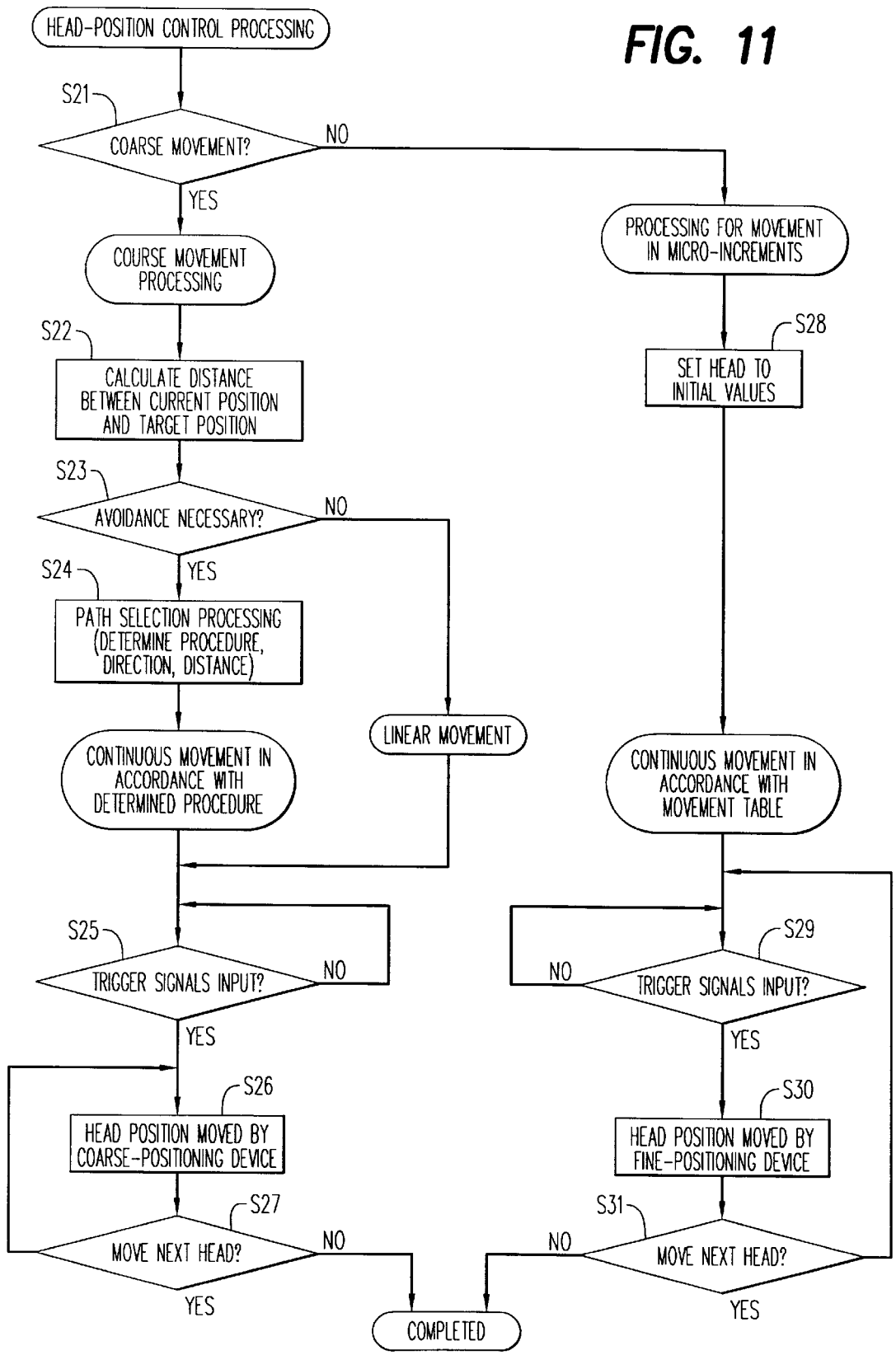
FIG. 11 is a flow chart pertaining to the position control of the head by the first example.

FIG. 8 is a block diagram showing the structure of head-position control module 233 of FIG. 5. Controller 270 in FIG. 8 is the control circuit that controls the operation of head-position control module 233. It is connected to main controller 220 via bus 235. The fine-position control processing in FIG. 11 is performed and the position control of head 104 is performed in spin stand 100 by controlling fine-positioning device 114 via bus 235 while referring to the operation processing data of the reference table in reference table memory 271 in response to the trigger signal OUT3. Furthermore, coarse-positioning device 115 generally has a large distance of movement and there is the possibility of the head or cassette impacting the spindle, etc. The path selection for impact avoidance is performed by main controller 220 and therefore, the coarse-positioning device is directly controlled by main controller 220 via bus 235.

Figure 9:
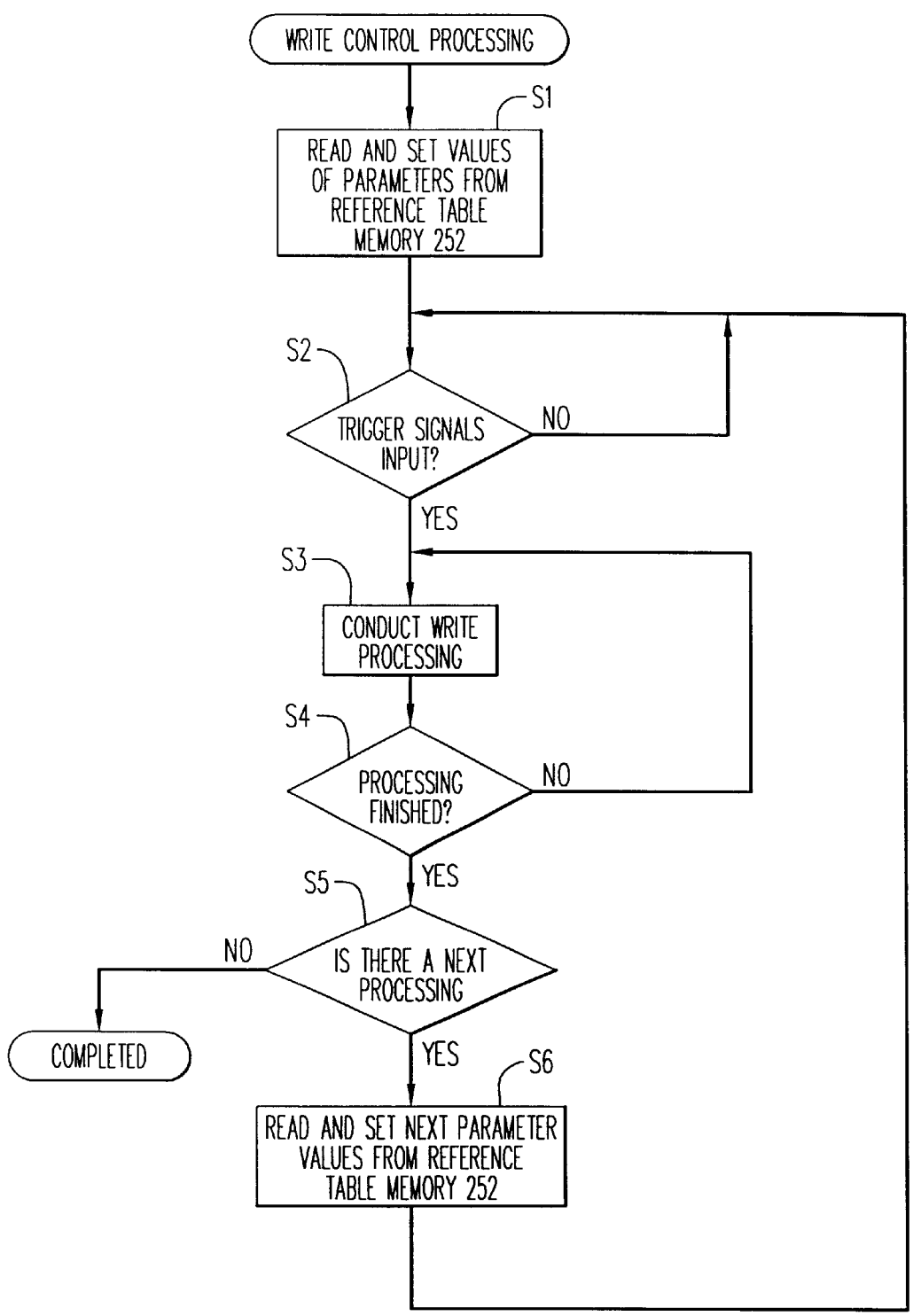
FIG. 9 is a flow chart showing the write control processing performed by write control module 231 of FIG. 6.

FIG. 9 is a flow chart showing the write control processing performed by write control module 231 in FIG. 6. The initial values of the parameters are first read and set from reference table memory 252 at step 1 in FIG. 9. Processing is on standby until trigger signals are input at step 2. If they are input (YES at step S2), write processing is performed at step S3. It is judged whether or not processing is finished at step S4. The write processing at step S3 is performed until processing is finished, and once processing is finished (YES at step S4), processing proceeds to step S5 and it is judged whether or not there is any next processing. When there is no next processing (NO at step S5), this write control processing is completed. On the other hand, if there is next processing (YES at step S5), the next parameter values are read and set from reference table memory 252 at step S6 and then processing returns to step S2 and the above-mentioned processing is repeated.

Figure 10:
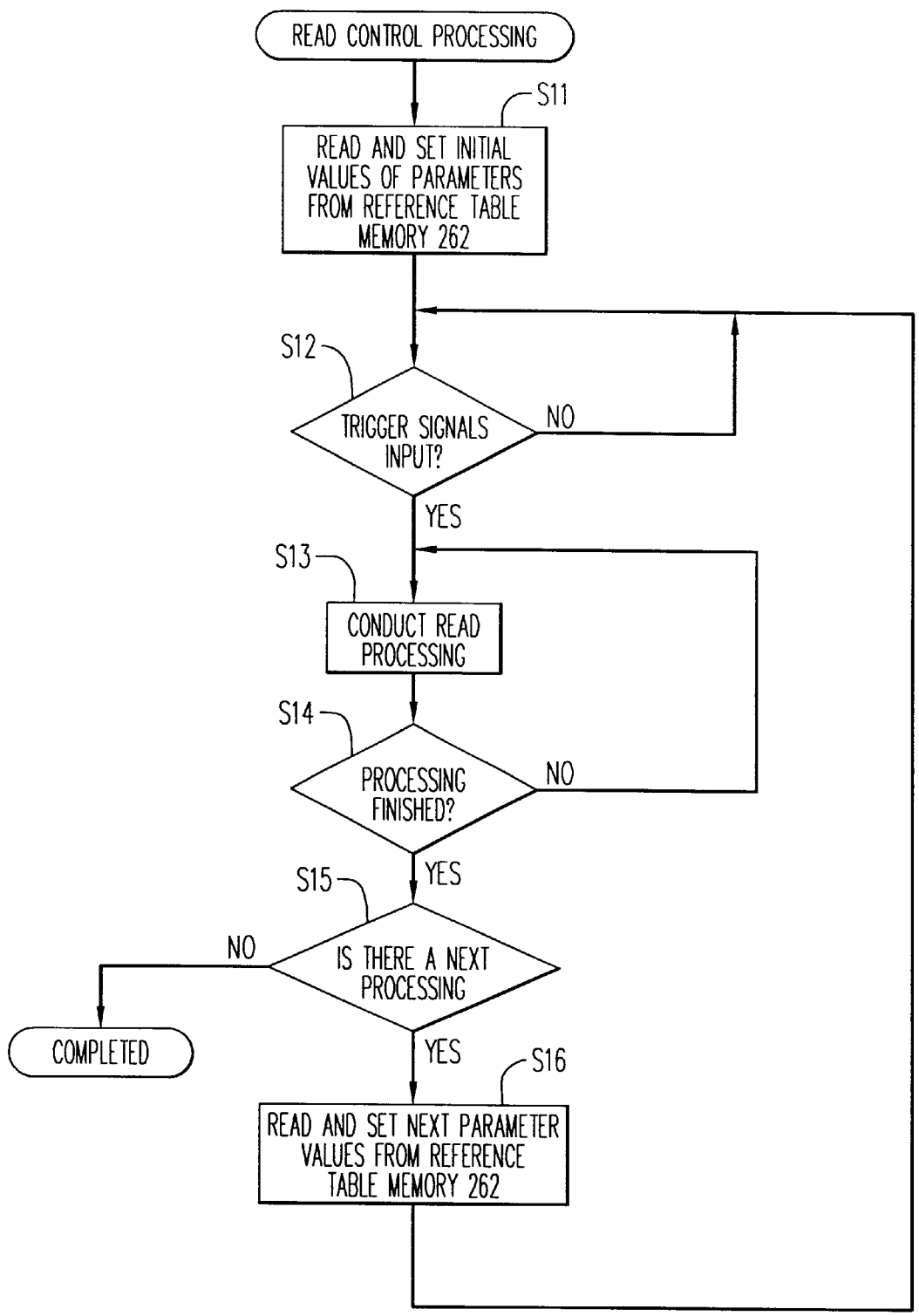
FIG. 10 is a flow chart showing the read control processing performed by read control module 232 of FIG. 7.

FIG. 10 is a flow chart showing the read control processing that is performed by read control module 232 in FIG. 7. First, the initial values of the parameters are read and set from reference table memory 262 at step S11 in FIG. 10. Processing is on standby until trigger signals are input at step S12. If they are input (YES at step S12), determination processing for reading is performed at step S13. It is judged whether or not processing is finished at step S14. Determination processing of step S13 is performed until processing is finished, and once processing is finished (YES in step 14), processing proceeds to step S15 and it is judged whether or not there is any next processing. When there is no next processing (NO at step S15), this read control processing is complete. On the other hand, when there is next processing (YES at step 15), the next parameter values are read and set from reference table memory 262 at step S16 and then processing returns to step S12 and the above-mentioned processing is repeated.

FIG. 11 shows a flow chart relating to the position control of head 104. It shows the flow chart that shows fine-position control processing of head 104 that is performed by head-position control module 233 in FIG. 8 and the flow chart that shows coarse-position control processing of head 104 by main controller 220 in FIG. 4.

The distance between the current position and movement target position of head 104 is found by calculation at step 21 in FIG. 11 during coarse-position control processing. The distance obtained by calculation is compared with a predetermined threshold value at step 22 and if it is a movement distance exceeding a predetermined threshold value (YES at step 22), there is a possibility of impact with head 104 or cassette 106. Processing proceeds to step 23 and the preferred path is selected from several possible movement paths at step 23. The movement procedure is determined and processing proceeds to step 24. Moreover, if the movement distance does not exceed a predetermined distance (NO in step 22), there is no possibility of impact with head 104 or cassette 106 and the fixed path, that is, the movement path with which there will be movement up to the target position by 1 linear movement, is determined and processing proceeds to step 24. Processing is on standby until trigger signals are input at step 25 and if they are input (YES at step S24), head 104 is moved in accordance with the selected movement method at step S25. Next, it is judged whether or not there is a next head movement at step S26. When there is no next head movement (NO at step S26), this head position control processing is finished. On the other hand, when there is a next head movement (YES in step S26), the processing returns to step S25 and the above-mentioned processing is repeated.

Moreover, the position of head 104 is controlled so that the position of head 104 is set at the predetermined home position at step 27 in FIG. 11 during fine-position control processing. Processing is on standby until trigger signals are input at step S28 and if they are input (YES at step 28), the head position moves by only the predetermined movement distance at step S29. Next, it is judged whether or not there is a next movement at step S30. If there is no next head movement (NO at step S30), this head position control processing is finished. On the other hand, if there is a next head movement (YES at step S30), the processing returns to step S28 and the above-mentioned processing is repeated.

Furthermore, it takes time to reach the focal position by movement of the head by the coarse-positioning device, that is, coarse movement, and the processing is not concluded within one index signal. On the other hand, there is convergence of movement within one index signal due to the head movement by the fine-positioning device, that is, fine movement in fine increments.

The determination of the movement procedure when it is judged that impact with head 104 or cassette 106 is possible here is described below in detail. There are various methods of operating the movement procedure of objects in order to avoid impact, but the method that has the shortest movement time, including calculation time, is appropriately selected based on the object that becomes the subject of operation during impact operation, that is, the complexity of the shape of cassette 106 and spindle 102, etc., the movement speed and possible direction of movement of the movement means, and the operation processing capability, etc.

In this example, a coarse-positioning device that can be moved in all directions is used for the coarse movement and therefore, the movement path is selected so that movement can be effected by the shortest distance. Moreover, a path with which impact is avoided is selected with polygon 107 covering head 104 and cassette 106 serving as the moving body and spindle 102 serving as the obstruction.

Figure 12:
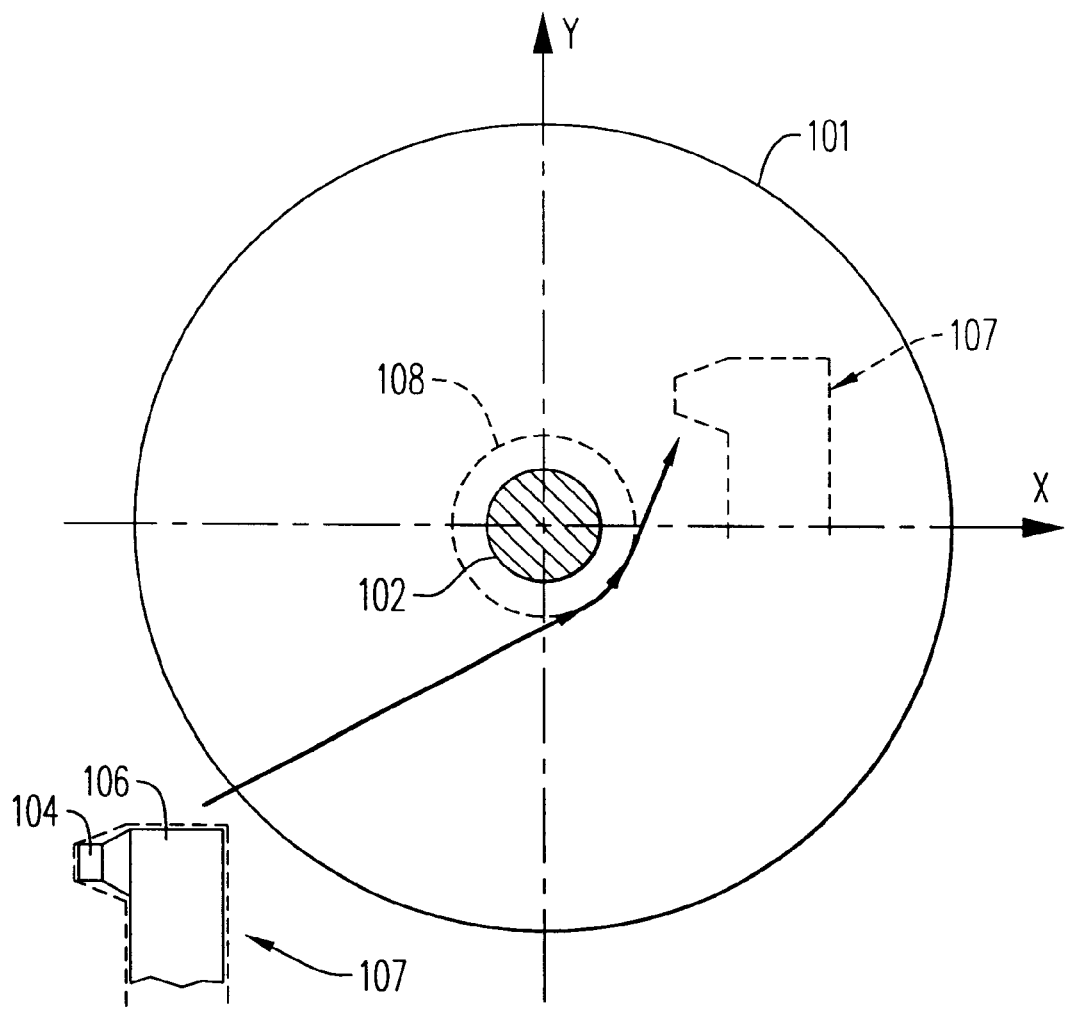
FIG. 12 is a top view showing the movement path for avoiding impact in a head testing device using the present invention.
Figure 13:
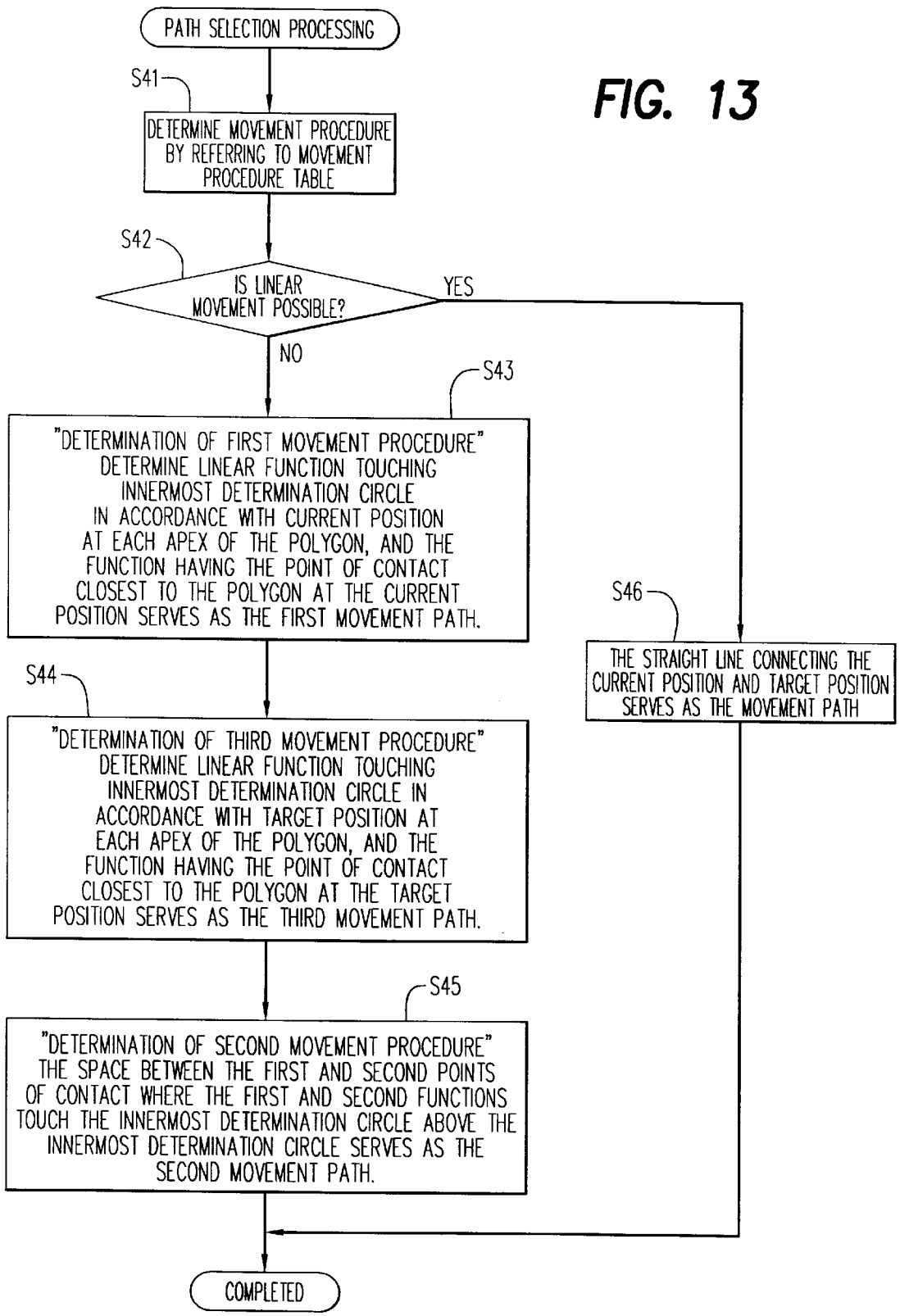
FIG. 13 is a flow chart showing the path selection processing of FIG. 11.
Figure 14:
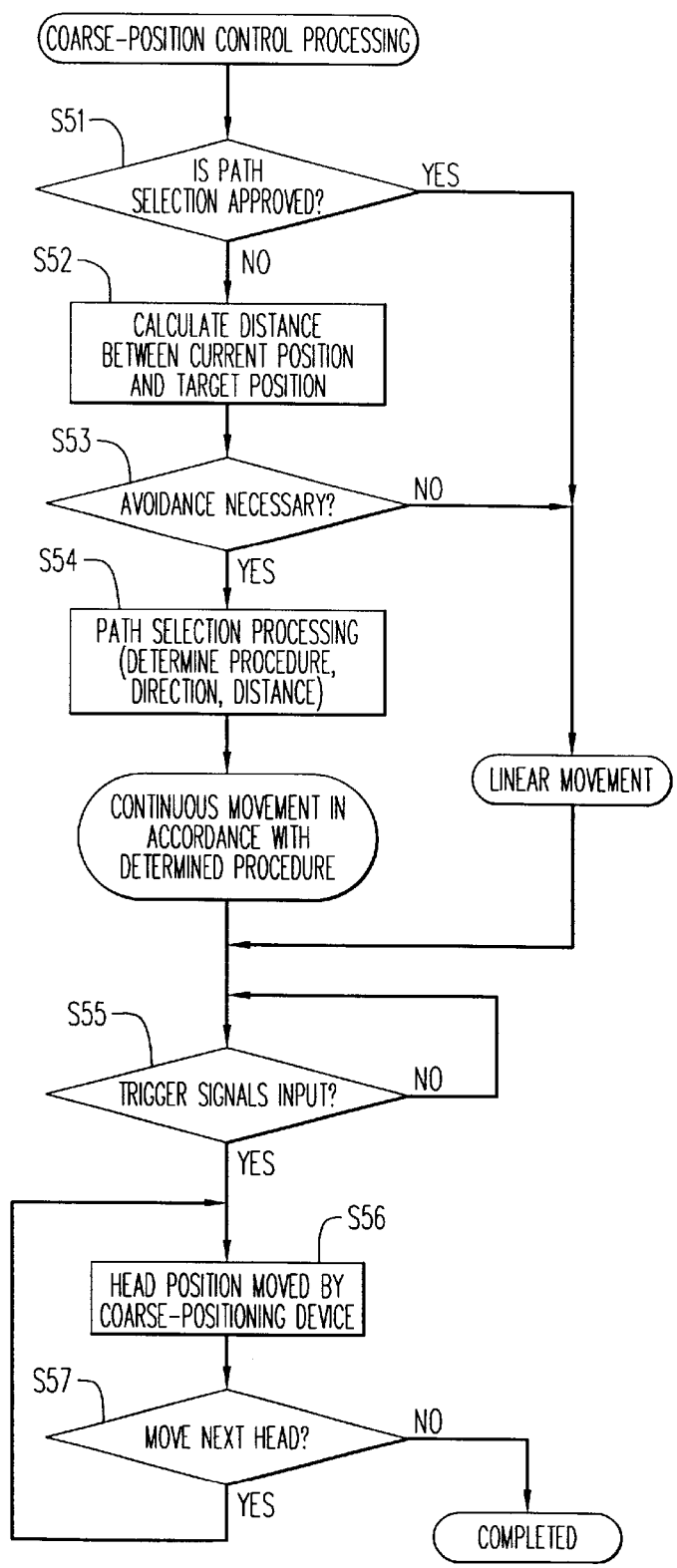
FIG. 14 is a flow chart relating to the position control of the head by the second example.

FIG. 12 is a top view of head 104, cassette 106 holding head 104, spindle 102, magnetic disk 101 and the movement path of head 104 that has been selected (solid arrows). First, the center of spindle 102 serves as the origin of 2-dimensional coordinates. Furthermore, the circle drawn with a broken line around spindle 102 is a circle (innermost determination circle hereafter) 108, which represents the innermost side of the region that can be determined with head 104. The head is made to approach from the minus direction of the Y axis by coarse-positioning device 115 and therefore, coarse-positioning device 115 will impact spindle 102. Consequently, the head cannot move directly between the first and second quadrants. Table 1 shows the movement procedure that was prescribed when moving from each quadrant to another quadrant. Head 104 constructs the movement procedure in accordance with this Table 1 and the flow chart in FIG. 13.

TABLE 1

| Movement procedure table | |
|---|---|
| First quadrant | 1→4→3→2 |
| Second quadrant | 2→3→4→1 |
| Third quadrant | 2←3→4→1 |
| Fourth quadrant | 2←3←2→1 |

For instance, head 104 is in the third quadrant and the movement target position is in the first quadrant during movement of head 104 in FIG. 12 and therefore, the head moves through the fourth quadrant to the first quadrant.

First, whether or not the straight line that joins the respective current position and target position has a point of contact with the innermost determination circle is processed at each apex of polygon 107 and if there is a point of contact (NO in step 42), it is assumed that there will be impact when the head moves linearly and therefore, processing proceeds to step 43 and path selection for impact avoidance is performed. If there is no point of contact (YES in step 42), the movement path of the head is a linear movement and path selection processing is finished at step 46.

Next, the linear function that represents the tangent that touches innermost circle 108 in the fourth quadrant is found by processing from the respective current position at each apex of polygon 107 at step 43 and the point of contact is selected so that the coordinates of the point of contact where this linear function touches innermost determination circle 108 are closest to polygon 107 (first point of contact hereafter). The linear function that is selected by this processing is the movement path of polygon 107 with which polygon 107 can go past innermost determination circle 108 without joining with innermost determination circle 108. This serves as the first linear function.

Then the linear function representing the tangent that touches innermost circle 107 in the second quadrant is found from the respective movement target position by processing at each apex of polygon 107. The point of contact is selected so that the coordinates of the point of contact where this linear function touches innermost circle 108 are closest to polygon 107 after movement to the target position. In this case, the point of contact is selected so that the Y coordinate of the point of contact is the largest (second point of contact hereafter). This serves as the second linear function. Moreover, the movement procedure for avoiding impact is determined as follows: That is, by means of the first procedure in step 43, head 104 is moved from its current position to the first point of contact so that the locus that is represented by the first linear function is depicted. Furthermore, by means of the second procedure at step 44, the head is moved so that it follows innermost determination circle 108 from the first point of contact to the second point of contact. Furthermore, by means of the third procedure at step 45, head 104 is moved from the second point of contact to the movement target position so that the locus represented by the second linear function is described.

The operation for selecting unwanted paths can be omitted during movement of head 104 by means of the path selection by the above-mentioned method for head positioning. Moreover, a movement path above magnetic disk 101 is selected so that the head always moves toward the inside of magnetic disk 101 and therefore, head 104 will not slip from above magnetic disk 101.

Furthermore, in the case of devices with which inertial forces are high when the head is moved by coarse-positioning device 115 and the acceleration time when movement starts and the deceleration time when movement is concluded takes up a large part of the movement time, there are times when as a result, the time consumed for the movement up to the target position is shorter with a longer movement distance and fewer numbers of procedures. A method whereby the movement is performed by further reducing the number of procedures is desirable at this time. That is, the head is moved by the first procedure from the current position to the point of intersection of the first linear function and the second linear function in accordance with the first linear function. If the point of intersection between the first linear function and second linear function is outside magnetic disk 101, the movement of the polygon is stopped at the outermost side of the magnetic disk. By means of the second procedure, the polygon is linearly moved from the position after the movement by the first procedure to the target position in accordance with the second linear function.

Moreover, a complex control becomes necessary when coarse-positioning device 115 performs a complex movement, such as movement along a curve. For instance, there are coarse-positioning devices that have a longer movement time in cases of movement in an oblique direction, even if the movement is linear. The method whereby the movement from the current position to the target position is simply divided into movement in the X direction and the Y direction and each movement is performed in order, as shown by the broken arrow in FIG. 12, is a movement method by this type of device. Although a movement procedure in the X and Y directions is usually constructed so that the movement of the polygon is movement making a wide circle around the spindle, when there is a position command from near the outer peripheral part of magnetic disk 101 to near the other outer peripheral part, there is a possibility that head 104 will slip from above the magnetic disk due to the method of the movement of the polygon in a wide circle around the spindle and therefore, the procedure in the X direction and Y direction is reversed. For instance, slipping of the head is prevented by constructing a procedure whereby movement is in direction Y and then in direction X when the procedure has previously had movement in direction X and then in direction Y.

Furthermore, by means of determination device 200 in FIG. 4, each function module 230, 231, 232, and 233 is programmed for 1 processing of 1 trigger signal and a processing series is performed without going through main controller 220. For example, write control module 231 writes on each sector while varying the write current and then read control module 232 performs a determination of each sector. Write control module 231 pre-programs the write current that should be set for each trigger signal in reference table memory 252 and changes in the setting of each sector are independently made by write control module 231. Moreover, the head-position control module continuously moves the head linearly without performing an impact operation for each trigger signal when the head is moving continuously in micro-increments. Thus, the head testing device can perform 1 processing for 2 sectors and high-speed head testing can be conducted.

Moreover, when an air-current disturbance is present over magnetic disk 101 and the head automatically moves, head 104 will vibrate and make strong contact with magnetic disk 101 if head 104 is dragged into the turbulence. There are cases where the user of the head testing device has thorough knowledge of the surface properties of magnetic disk 101 and wishes to establish a movement path manually and not use the movement path selected as in the first example. Therefore, a second example is described of a compulsory setting of the flow of movement of head 104 manually in order to avoid impact. This differs from the first example in that step S51 has been added. By adding step S51, path-selection approval commands are received together with the position commands and if the path-selection approval commands do not approve the operation (NO in step S51), the head can move linearly to a position in accordance with the position commands. If the path selection approval commands do approve the operation (YES in step S51), path selection processing is performed.

The head is attached upright to the cassette in these examples, but it is possible that the head or cassette will impact the spindle if the head is attached sideways to the cassette, and the present technology can be similarly applied for high-speed positioning of the head.

As previously explained in detail, the present invention has the above-mentioned structure and effects. Therefore, by judging whether or not an impact avoidance path is necessary in accordance with the distance of head movement, it is possible to move the head on a fixed path without performing the operation of an impact avoidance path and as a result, the head positioning speed is increased.

In addition, the method of increasing the head-positioning speed is used, and therefore, it is possible to present a testing device that tests one or both of a head and recording medium to which is attached a spin stand for head determination that makes possible high-speed, highly accurate determinations.

I claim:

1. A method for head positioning by means of a device having a recording medium, a head for operating the recording medium and sending and receiving information to and from said recording medium, and a positioning control mechanism that positions the head by moving it from the first to the second position in accordance with position commands, said method comprising:

receiving position commands and determining whether or not the distance between said first position and said second position exceeds a predetermined threshold;

if said distance does not exceed said predetermined threshold, moving said head along a predetermined fixed path; and if said distance exceeds said predetermined threshold value, selecting one of a plurality of other paths and moving said head along said selected path.

2. A method for head positioning by means of a device having a recording medium, a head for operating the recording medium and sending and receiving information to and from said recording medium, and a positioning control mechanism that positions the head by moving it from the first to the second position in accordance with position commands, said method comprising:

receiving position commands and path selection approval commands that approve a path selection;

if said path selection approval commands do not approve the path selection, moving said head along a predetermined fixed path based on said position commands; and if said path selection approval commands do approve the path selection, selecting one of a plurality of other paths based on said position commands and moving said head along said selected path.

* * * * *